US006339831B1

United States Patent
Sugawara et al.

(10) Patent No.: US 6,339,831 B1
(45) Date of Patent: Jan. 15, 2002

(54) AUTOMATIC DETECTING UNIT FOR DIAGNOSING A CONNECTION AND IDENTIFYING AN EXTERNAL DEVICE, INFORMATION PROCESSING APPARATUS, AND EXTERNAL DEVICE

(75) Inventors: Takashi Sugawara, Yokohama; Hirohide Komiyama, Zama, both of (JP)

(73) Assignee: International Business Machines Corp., Armonk, NY (US)

(*) Notice: Subject to any disclaimer, the term of this patent is extended or adjusted under 35 U.S.C. 154(b) by 0 days.

(21) Appl. No.: 09/151,993

(22) Filed: Sep. 11, 1998

(30) Foreign Application Priority Data

Sep. 11, 1997 (JP) .............................. 9-248863

(51) Int. Cl.[7] .............................................. H02H 3/05
(52) U.S. Cl. .............................................. 714/3; 710/9
(58) Field of Search ............................ 710/3, 9; 714/3, 714/742, 735, 736, 745, 721, 799, 43, 25

(56) References Cited

U.S. PATENT DOCUMENTS

| | | | | |
|---|---|---|---|---|
| 5,148,389 A | * | 9/1992 | Hughes | 710/9 |
| 5,491,830 A | * | 2/1996 | Ferri | 710/9 |
| 5,530,831 A | * | 6/1996 | Akiyama et al. | 711/114 |
| 5,666,557 A | * | 9/1997 | Cassidy et al. | 710/8 |
| 5,865,546 A | * | 2/1999 | Ganthier et al. | 400/489 |
| 5,909,596 A | * | 6/1999 | Mizuta | 710/63 |
| 6,044,423 A | * | 3/2000 | Seo et al. | 710/103 |

\* cited by examiner

*Primary Examiner*—Robert Beausoleil
*Assistant Examiner*—X. Chung-Trans
(74) *Attorney, Agent, or Firm*—Douglas W. Cameron; Anne Vachon Dougherty (57) ABSTRACT

A system and method for detecting connection of an external device, and for identifying the connected external device. The external device comprises: a first identification pin group consisting of one or more connector pins arranged in the longitudinal direction at one end of the connector; a second identification pin group consisting of more than one connector pins arranged in the longitudinal direction at the other end of the connector; and a control pin assigned for one pin on one end of the connector. In the external device, identification information is formed in accordance with a connection of the control pin and at least one pin among the second identification pin group, and a connection or disconnection of the control pin relative to each pin in the pin groups. When a control signal at the first signal level is supplied to the control pin of the external device through the control signal line, and when the signal level at at least one pin in the second identification pin group is the first signal level, it is assumed that there is normal contact at both ends of the oblong connector, and that the connection for the external device is preferable. The connections of the pins in the first and the second identification pin groups in the connected external device indicate combinations of signal levels. Thus, the identification means can identify the external device by reading the combinations of signal levels at the identification pins.

10 Claims, 5 Drawing Sheets

| CONNECTION TO CONTROL PIN | | | ID READ BY ID CONTROLLER | | | USE VALID / INVALID |
|---|---|---|---|---|---|---|
| ID0 | ID1 | ID2 | ID0 | ID1 | ID2 | |
| NO | NO | NO | 1 | 1 | 1 | INVALID |
| NO | NO | YES | 1 | 1 | 0 | VALID |
| NO | YES | NO | 1 | 0 | 1 | VALID |
| NO | YES | YES | 1 | 0 | 0 | VALID |
| YES | NO | NO | 0 | 1 | 1 | INVALID |
| YES | NO | YES | 0 | 1 | 0 | VALID |
| YES | YES | NO | 0 | 0 | 1 | VALID |
| YES | YES | YES | 0 | 0 | 0 | VALID |

TABLE 1

FIG.6

AUTOMATIC DETECTING UNIT FOR DIAGNOSING A CONNECTION AND IDENTIFYING AN EXTERNAL DEVICE, INFORMATION PROCESSING APPARATUS, AND EXTERNAL DEVICE

FIELD OF THE INVENTION

This invention relates to an automatic detection technology by which an external device, such as adaptor card and a drive unit, can be preferably connected to an information processing apparatus, such as a computer system, and in particular to an automatic detection technology for identifying a connected external device and detecting a connection failure. More specifically, the present invention pertains to an automatic detection technology employing a minimum number of pins in a connector to detect a connection failure and to identify an external device.

BACKGROUND OF THE INVENTION

In accordance with recent technological developments, various types of computer systems, such as desktops, towers and notebook, have been produced and are being sold. In particular, as the costs of components have been reduced because of the availability of enhanced semiconductor technology, general-purpose personal computers (PCs) designed for ordinary users have become popular.

As well known, a computer system comprises a main system which includes a CPU and a memory, and a plurality of subsystems, such as a video subsystem, a storage subsystem and a network subsystem. The main system is constituted by main circuit components, such as a CPU and a memory, and these components are generally mounted on a printed board called a planar or a motherboard.

As is well known to those having ordinary skill in the art, there are a plurality of subsystem types having different specifications and standards. For example, a plurality of types of video subsystems, such as a standard video subsystem and an enhanced video subsystem, are produced in accordance with specific resolutions and functions.

If the planar includes subsystems as its components, the planar must be designed again each time one of the subsystems is re-designed. Or, a plurality of planars must be prepared equivalent to the number of possible combinations of subsystems. This deteriorates the production efficiency and makes it difficult to cope with model renewal promptly. Therefore, at present, the subsystems are provided in the form of cards apart from the planar so that the cards can be detached/replaced.

The subsystems are provided for a system planar as adaptor cards, such as a video adaptor, a LAN adaptor and a SCSI (Small Computer System Interface) adaptor. The subsystems can also be provided as drive units, such as a hard disk drive (HDD), a floppy disk drive (FDD) and a CD-ROM drive. Connectors for electrically connecting these cards or drive units are provided on the planar to facilitate the detachment and replacement of the subsystems. A video card, such as "cyber9320," "cyber9385" or "cyber9385+H/W MPEG," is detachably connected to a video subsystem connector. A CD-ROM drive and a DVD drive, for example, are detachably connected to a storage subsystem connector. These connectors generally have an oblong structure in which signal pins are arranged in one direction.

When a plurality of devices are detachably connected to one connector, a mechanism for diagnosing connection problems and a mechanism for identifying connected devices are required to ensure the normal operation of the system and the smooth utilization of the devices. The mechanism for diagnosing the connection can perform a diagnostics program and can easily determine whether the cause of a malfunction is a connection failure. Since an alarm can be issued to a user instantaneously and directly, especially for an apparatus, such as an FDD or a CD-ROM drive, that a user manually handles, such mechanisms are very effective.

Furthermore, the identification mechanism can automatically identify the types of subsystems that are currently installed by the execution of certain firmware. Therefore, system configuration data can be automatically reconfigured, and a so-called PnP (plug-and-play) function can be implemented. Even during the power saving state when a suspended system is not completely powered off, replacement of subsystems is possible (for example, an FDD can be replaced by a CD-ROM drive).

Figure 3:
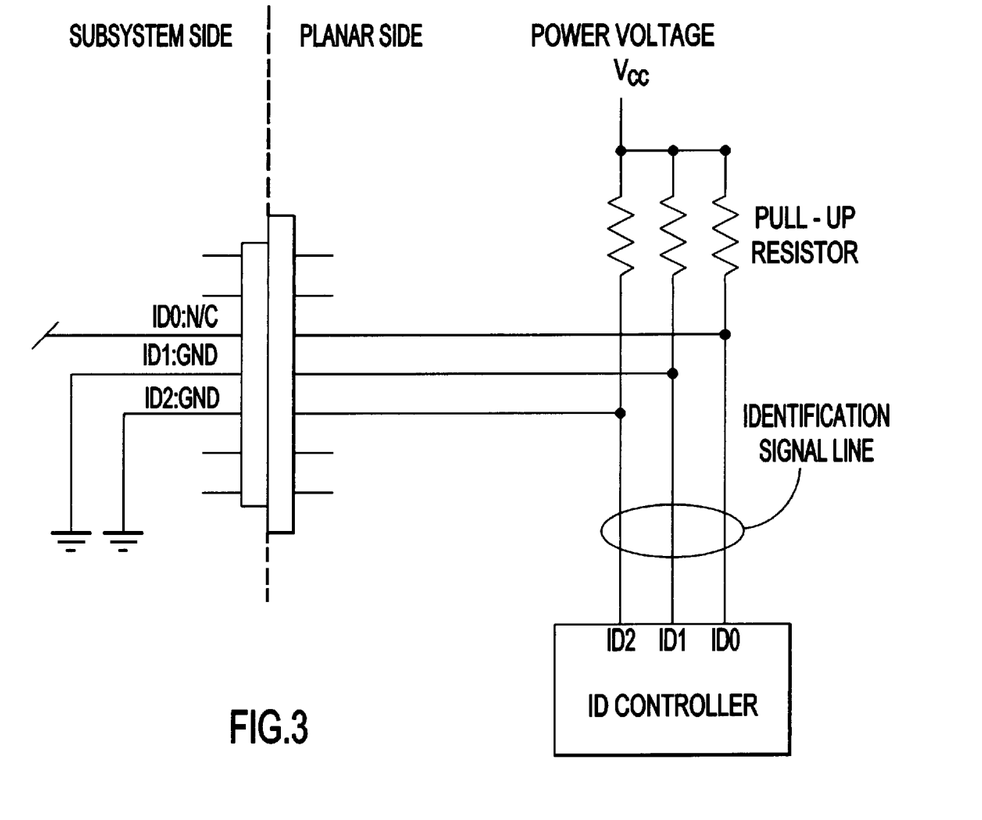
FIG. 3 shows an example identification mechanism for a subsystem.

FIG. 3 shows an example identification mechanism for a subsystem. In FIG. 3, three pins in a connector that electrically connects a subsystem to a planar are assigned to identification (ID) pins (ID0, ID1 and ID2). In the subsystem, identification information for the subsystem can be specified by either grounding the ID pins or by setting them in the opened state. An ID controller (tentatively named) on the planar can accept an identification signal obtained by pulling up the ID signals using a power voltage $V_{cc}$, and thereby read identification information for the subsystem. According to the example depicted in FIG. 3, since the identification information is expressed using three bits, a maximum of eight different subsystems (precisely, seven types, excluding an ID value indicating a connection failure, which will be described later) can be identified.

The subsystem depicted in FIG. 3 has the identification information (ID0, ID1, ID2)=(1, 0, 0). The ID controller reads (1, 0, 0), i.e., identification number 1 (=2° C.), and specifies the name of the device currently employed as a subsystem. When a connection failure occurs at a connector, the ID pins are set in the opened state, i.e., go high. In this case, the ID controller obtains the identification information (ID2, ID1, ID0)=(1, 1, 1), i.e., ID value 7, and detects a connection failure.

According to the example depicted in FIG. 3, the identification mechanism for the planar and a single subsystem is shown. When the planar permits connections with multiple subsystems, the number of subsystem connectors on the planar is increased, and the number of ID signals is accordingly increased in proportion.

Figure 4:
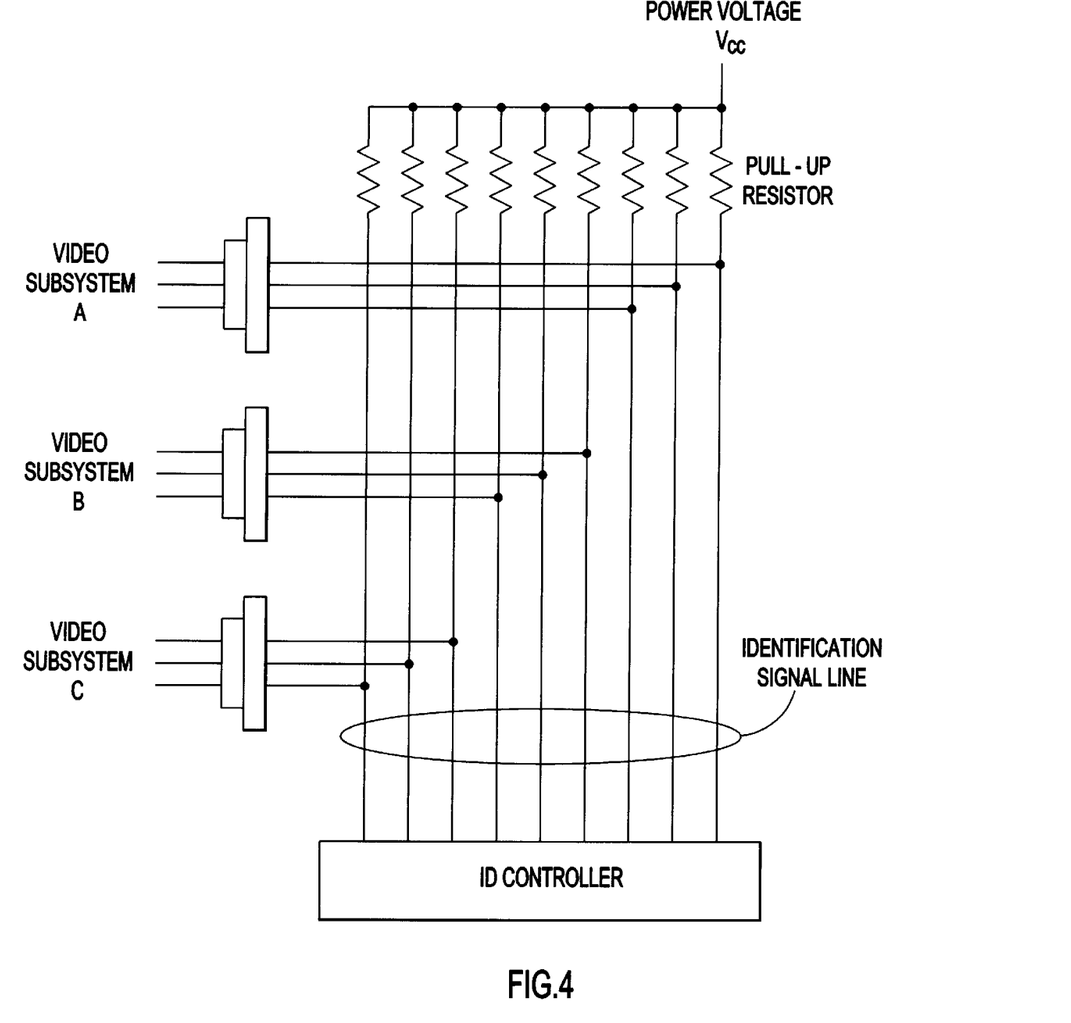
FIG. 4 shows an example where a planar permits the connection of three subsystem types, i.e., subsystems A, B and C.

FIG. 4 shows an example where a planar permits the connection of three subsystems A, B and C. When the subsystem connectors each employ three ID pins, a total of nine ID pins are required, and an ID controller requires an ID signal having a 9-bit width. However, since the number of input pins for the ID controller is limited, it is difficult to assign dedicated ID pins for all the subsystems.

As was previously described, the connector has an oblong structure in which connector pins are arranged in one direction. With this structure, the connection failure shown in FIG. 5 occurs frequently as the result of an unskillful, diagonal insertion of a connector. However, in the arrangement wherein ID pins that are also employed for the detection of a connection failure are concentrated at one location (e.g. the center of the connector in FIG. 5) in the longitudinal direction of the connector, so long as the connection at that location is correct the identification number can still be read, and a connection failure will not be detected.

It is, therefore, one object of the present invention to provide a superior automatic detection technology for the preferable connection of external devices, such as an adaptor card and a drive unit, with the main body of an information processing apparatus, such as a computer system.

It is another object of the present invention to provide a superior automatic detection technology for identifying external devices mounted, and for detecting a connection failure.

It is an additional object of the present invention to provide a superior automatic detection technology that employs a minimum number of pins of a connector to implement both the detection of a connection failure and the identification of an external device.

SUMMARY OF THE INVENTION

To achieve the above objects, according to a first aspect of the present invention, an automatic detection unit for identifying an external device and diagnosing connections, comprises: (a) an oblong-shaped connector having a plurality of connector pins; (b) a first identification pin group consisting of one or more connector pins arranged in the longitudinal direction at one end of the connector; (c) a second identification pin group consisting of more than one connector pins arranged in the longitudinal direction at the other end of the connector; (d) a control signal line assigned to one pin on one end of the connector; (e) means for applying a second signal level to the control signal line; (f) selection means for setting the control signal line to a first signal level to diagnose a connection with an external device and to identify the external device, and to maintain the control signal line at the second signal level on all other occasions; (g) an identification signal line along which to transmit the respective signal levels at pins in the first and the second identification pin groups; (h) diagnostic means for diagnosing the connection with an external device connected through the connector by determining whether the first signal level is detected among the second identification pin group when the control signal line is reduced to the first signal level; and (i) identification means for reading a combination of the signal levels at the pins in the first and the second identification pin groups and identifying an external device connected through the connector when the control signal line is reduced to the first signal level.

According to a second aspect of the present invention, an automatic detection unit for identifying a plurality of external devices and diagnosing connections, comprises: (a) an oblong-shaped connector provided for each of external devices, each of the connectors having a plurality of connector pins; (b) first identification pin groups provided for each of the connectors, each of the first identification pin groups consisting of one or more connector pins arranged in the longitudinal direction at one end of the connector; (c) second identification pin groups provided for each of the connectors, each of the second identification pin groups consisting of more than one connector pins arranged in the longitudinal direction at the other end of the connector; (d) control signal lines provided for each of the connectors and assigned to one pin on one end of the connector; (e) means for applying a second signal level to the control signal lines; (f) selection means for setting one of the control signal lines to a first signal level to diagnose connection with an external device and to identify the external device, and maintaining the control signal lines at the second signal level on all other occasions; (g) an identification signal line along which to transmit the respective signal levels at pins in the first and the second identification pin groups; (h) diagnostic means for diagnosing the connections with an external device connected through one of the connectors by determining whether the first signal level is detected among the corresponding second identification pin group when the control signal line is reduced to the first signal level; and (i) identification means for reading a combination of the signal levels at the pins in the corresponding first and second identification pin groups and identifying an external device connected through one of the connectors when the corresponding control signal line is reduced to the first signal level.

According to a third aspect of the present invention, an automatic detection unit for identifying a plurality of external devices and diagnosing connections, comprises: (a) an oblong-shaped connector provided for each of a plurality of external devices, each of the connectors having a plurality of connector pins; (b) first identification pin groups provided for each of the connectors, each of the first identification pin groups consisting of one or more connector pins arranged in the longitudinal direction at one end of the connector; (c) second identification pin groups provided for each of the connectors, each of the second identification pin groups consisting of more than one connector pins arranged in the longitudinal direction at the other end of the connector; (d) control signal lines provided for each of the connectors and assigned to one pin on one end of the connector; (e) means for applying a signal level to the control signal lines; (f) selection means for setting one of the control signal lines to a low signal level to diagnose connection with an external device and to identify the external device, and maintaining the control signal lines at the high signal level on all other occasions; (g) an identification signal line along which to transmit the respective signal levels at pins in the first and the second identification pin groups; (h) diagnostic means for diagnosing the connections with an external device connected through one of the connectors by determining whether the low signal level is detected among the corresponding second identification pin group when the control signal line is reduced to the low signal level; and (i) identification means for reading a combination of the signal levels at the pins in the corresponding first and second identification pin groups and identifying an external device connected through one of the connectors when the corresponding control signal line is reduced to the low signal level.

In an automatic detection unit according to the second and the third aspects, the identification signal line may be multiplexed and employed between the connectors. An automatic detection unit according to the first to the third aspects may be mounted on the planar of an information processing apparatus that employs a connector for external device expansion. In an automatic detection unit according to the second and the third aspects, a plurality of connectors are prepared to accept a plurality of external devices. The identification signal line may be multiplexed and employed for all the connectors.

According to a fourth aspect, an external device which can be connected to another apparatus through an oblong-shaped connector having a plurality of connector pins, comprises: (a) a first identification pin group consisting of one or more connector pins arranged in the longitudinal direction at one end of the connector; (b) a second identification pin group consisting of more than one connector pins arranged in the longitudinal direction at the other end of the connector; (c) a control pin assigned for a pin on one end of the connector; and (d) identification information forming means for connecting at least one pin among the second identification pin group to the control signal line, and forming identification information in accordance with the combination of the connection and disconnection between the respective pins among the first and second identification pin groups and the control signal line.

An external device according to the fourth aspect of the present invention is employed by connecting it to the automatic detection unit or to the information processing apparatus according to the first to the third aspects that has the automatic detection unit.

According to a fifth aspect, an external device which can be connected through a connector to an automatic detection unit defined in one of the first to the third aspects, comprises: (a) a first identification pin group consisting of one or more connector pins arranged in the longitudinal direction at one end of the connector; (b) a second identification pin group consisting of more than one connector pins arranged in the longitudinal direction at the other end of the connector; (c) a control pin for receiving a control signal line at one end of the connector; and (d) identification information forming means for connecting at least one pin among the second identification pin group to the control signal line, and forming identification information in accordance with the combination of the connection and disconnection between the respective pins among the first and second identification pin groups and the control signal line.

The automatic detection unit according to the first to third aspects of the present invention provides interrelational operation by connecting an external device according to the fourth and the fifth aspects to a connector. The external device comprises: (a) a first identification pin group consisting of one or more connector pins arranged in the longitudinal direction at one end of the connector; (b) a second identification pin group consisting of more than one connector pins arranged in the longitudinal direction at the other end of the connector; (c) a control pin assigned for one pin on one end of the connector; and (d) identification information forming means for connecting at least one pin among the second identification pin group to the control signal line, and forming identification information in accordance with the combination of the connection and disconnection between the respective pins among the first and second identification pin groups and the control signal line.

The automatic detection unit according to the first aspect of the present invention accepts, with pins arranged in a connector, the first and the second identification pin groups of the external device. A control signal is input to the control pin. The signal levels at the individual pins in the first and the second identification pin groups are transmitted to the identification means and the detection means along the respective identification signal lines. The identification means and the detection means may be mounted on a single controller chip. The identification signal lines are maintained at the second signal level.

To perform automatic detection, an identification signal at the first signal level is applied to the control pin of the external device through the control signal line. When the signal level at at least one pin among the second identification pin group is the first signal level, it is assumed that there is normal contact at both ends of the oblong connector, and it is also determined that the connection for the external device is preferable. If a connection failure occurs because the connector is inserted diagonally, a control signal at the first signal level will not be transmitted from the control pin to the second identification pin group. Therefore, if all the second identification pins remain at the second signal level, the connection failure of the external device will be detected.

In the external device, the identification information expressed by the first and the second identification pin groups depends on whether the pins are connected to or disconnected from the control pin. When a control signal at the first signal level is received along the control signal line, the connections of the pins among the first and the second identification pin groups to the control signal are regarded as combinations of signal levels. Thus, the identification means can identify the external device by reading the combinations of the signal levels at the identification pins. The first signal level may be low, and the second signal level may be high.

The connector is provided for each external device that is accepted by the automatic detection unit. When, for example, a computer system mounting the automatic detection unit accepts three types of subsystems, three connectors are prepared for the connection of external devices.

According to the second and the third aspects of the present invention, an automatic detection technology is provided for a plurality of connectors. A control signal at the first signal level (low) is selectively transmitted only along the control signal line of a connector at which the connection of an external device is to be detected. In the external device connected to the selected connector, a control signal at the first signal level (low) is input to the control pin. If at least one pin in the second identification pin group indicates the first signal level (low), it is assumed that there is normal contact at both ends of the oblong-shaped connector and it is also determined that the connection for the external device is preferable. If a connection failure occurs because the connector is inserted diagonally, the control pin or the second identification pin group is apart from the connector, and a control signal at the first signal level (low) is not transmitted to the second identification pin group. Thus, when all the second identification pins maintain the second signal level (high), the connection failure at the connector is accordingly detected.

Furthermore, in the external device, the identification information is formed in accordance with a combination of the pins in first and the second identification pin groups, and depends on whether pins are connected to or disconnected from the control pin. When a control signal at the first signal level (low) is transmitted to a specific connector, the connection combination of pins in the first and the second identification pin groups in the external device connected to the connector is indicated as a combination of the signal levels. Therefore, the identification means can identify the external device connected to the connector by reading the combination of the signal levels (low/high) at the individual identification pins.

In addition, the number of signals used for identification can be reduced by multiplexing the identification signal lines among the connectors. In this invention, a specific connector can be exclusively selected by applying the corresponding control signal line to the first signal level (low), and an external device connected to that connector is both detected and identified. That is, since two or more connectors do not use an identification signal line at the same time, multiplexing of the signal line is possible.

DESCRIPTION OF THE DRAWINGS

These and other objects, features, and advantages of the present invention will become apparent in due course during the detailed description of the preferred embodiment of the present invention, which will be given while referring to the accompanying drawings wherein.

DESCRIPTION OF THE PREFERRED EMBODIMENT

Figure 1:
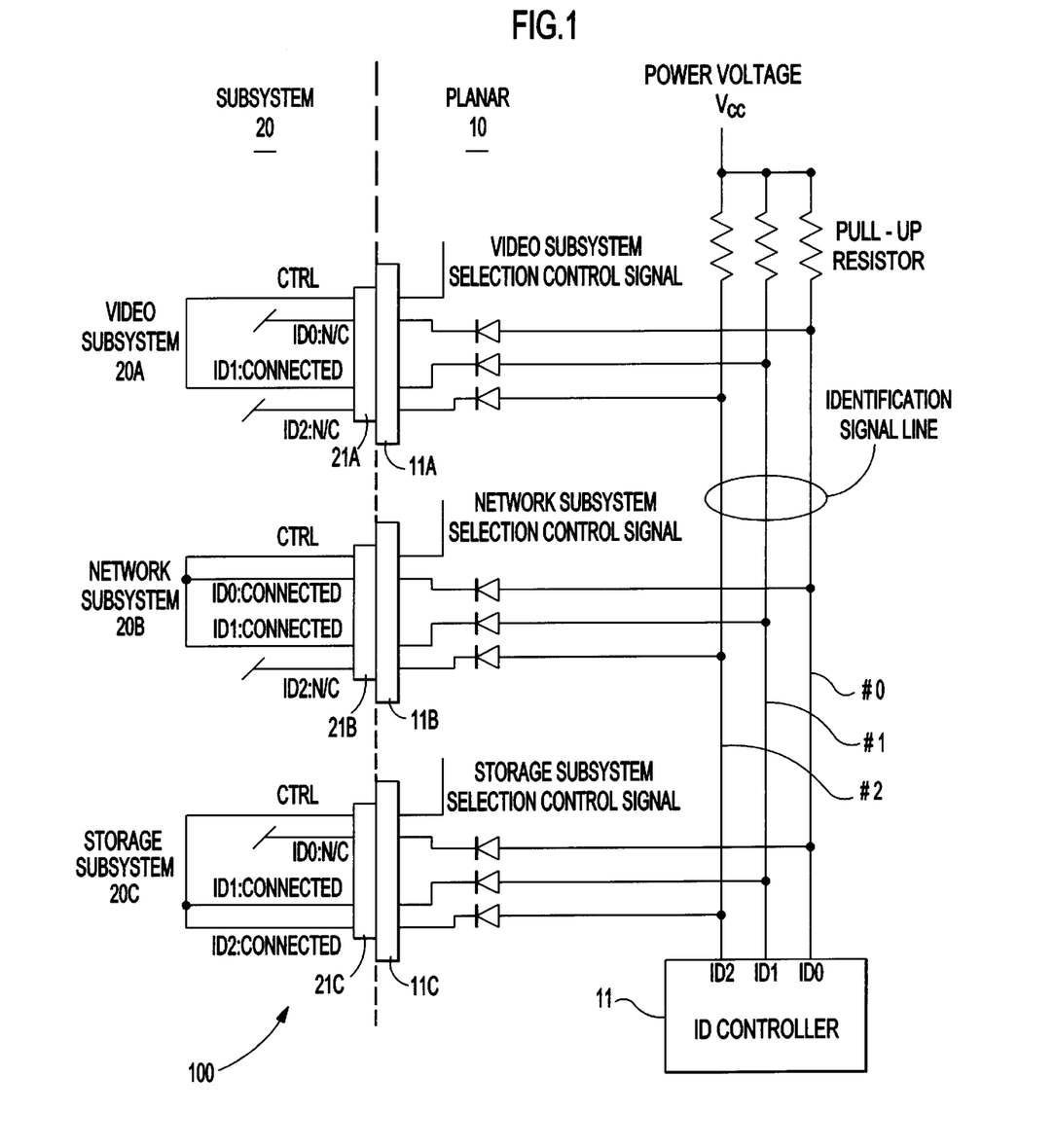
FIG. 1 shows the hardware arrangement of an information processing apparatus, for automatic detection of an external device, embodying the present invention.

FIG. 1 shows the hardware arrangement of an information processing apparatus 100 embodying the automatic detection of an external device according to the present invention, and shows in particular the components associated with the implementation of the present invention. An example information processing apparatus 100 is a general-purpose personal computer that conforms to the OADG (PC Open Architecture Developer's Group) standards.

The information processing apparatus 100 comprises a motherboard or planar 10 on which main circuit components, such as CPUs, memories, and peripheral controller chips (not shown), are mounted; and subsystems that are provided as peripheral devices for the apparatus 100.

According to the example depicted in FIG. 1, three types of subsystems, a video subsystem 20A, a network subsystem 20B and a storage subsystem 20C, are provided. The planar 10 provides connectors 11A, 11B and 11C for connecting the respective subsystems 20a, 20B and 20C. While three subsystems are provided for the planar 10 in this embodiment, the number of subsystems has no effect on the implementation of the present invention. Either fewer than or more than three subsystems may be prepared.

The video subsystem 20A, which is a peripheral device for providing video functions, such as three-dimensional graphics, for the system 100, handles graphic information and outputs generated display data to a display unit (not shown). The network subsystem 20B is a peripheral device for the connection of the system 100 to a network. An example network subsystem 20B is a modem card for transmission of digital computer data over an analog public switched telephone network (PSTN). The storage subsystem 20C is a peripheral device for providing a large memory area for the system 100, and corresponds to a hard disk drive (HDD), a floppy disk drive (FDD), a CD-ROM drive, or a DVD (Digital Versatile Disc) drive.

The subsystems 20A, 20B and 20C are external devices to be detachably connected to the system 100, and are provided as adaptor cards or units (e.g., drive units) for the system 100. The subsystems 20A, 20B and 20C respectively have connectors 21A, 21B and 21C for electric connections with the planar 10. The electric and mechanical standards for the connectors 21A, 21B and 21C match those for the corresponding connectors 11A, 11B and 11C of the planar 10. The same subsystem are exclusively accepted by the corresponding connectors 11A, 11B and 11C of the planar 10.

The connectors 21A, 21B and 21C of the subsystem 20 have oblong structures in which connector pins are arranged in one direction. One pin at one end of each connector 21 is defined as a control pin (Ctrl). When a specific external device 20 is inserted into the connector 11 on the planar 10, the Ctrl is connected to a control signal line (which will be described later). The planar 10 can select a specific connector 11, for which automatic detection (described later) is to be performed, by asserting a low level for one of the control signal lines.

In this embodiment, connectors 21A, 21B and 21C respectively have three identification pins, ID0, ID1 and ID2. As is shown in FIG. 1, ID0 is allocated to a connector pin at one end (on the same side as the control pin) of the oblong connector, and ID1 and ID2 are allocated to connector pins at the other end. By combining low/high readings taken at the three identification pins, the identification data for the external device can be indicated. By employing the 3-bit identification pins, a maximum of 8 ($=2^3$) external devices can be identified.

Conventionally, a low level is produced by grounding the pin and a high level is produced by disconnecting a pin (No Connection (N/C)) or by pulling up the level. However, in this embodiment, since a low level is to be applied to the control pin during the course of the automatic detection, a control signal at a low/high level is produced by the connection or disconnection of the identification pins ID0, ID1 and ID2 relative to the control pins.

FIG. 2 shows the combinations for the connection/disconnection of the identification pins ID0, ID1 and ID2 and the control pins, in order to implement the automatic detection technology of the present invention.

Figure 2A:
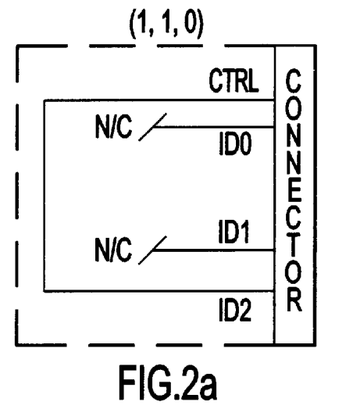
FIG. 2 shows the combinations, of connections/disconnections of identification pins ID0, ID1, and ID2 and control pins, that are permitted for the implementation of the automatic detection according to the present invention.
Figure 2B:
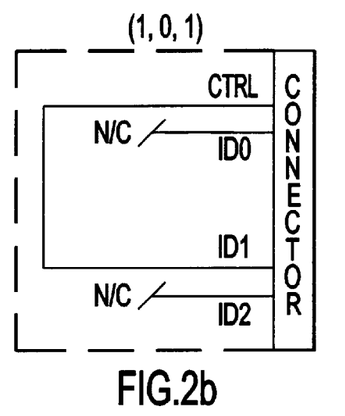
Figure 2C:
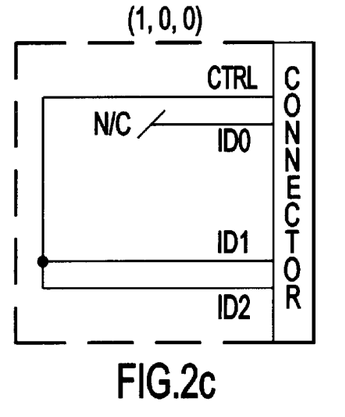
Figure 2D:
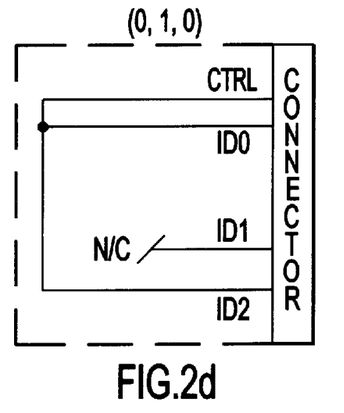
Figure 2E:
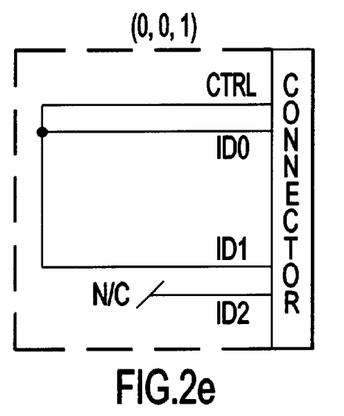
Figure 2F:
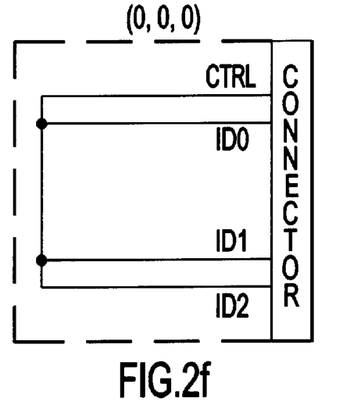

In FIG. 2(a), only the identification pin ID2 is connected to the control pin Ctrl, and the identification pins ID0 and ID1 are disconnected. In this state where a control signal at a low level is asserted for the control pin, only the ID2 is changed to low. Therefore, the identification information read by the ID controller 11 (which will be described later) is (ID0, ID1, ID2)=(1, 1, 0), and the identification number is $2°$ C.$+2^{1=3}$. Similarly for the respective states shown in FIGS. 2(b), 2(c), 2(d), 2(e) and 2(f), identification data read by the ID controller 11 are (ID0, ID1, ID2)=(1, 0, 1) (identification number: $5=2°$ C.$+2^2$), (ID0, ID1, ID2)=(1, 0, 0) (identification number: $1=2°$ C.), (ID0, ID1, ID2)=(0, 1, 0) (identification number: $2=2^1$), (ID0, ID1, ID2) =(0, 0, 1) (identification number: $4=2^2$), and (ID0, ID1, ID2)=(0, 0, 0) (identification number: 0).

Figure 5:
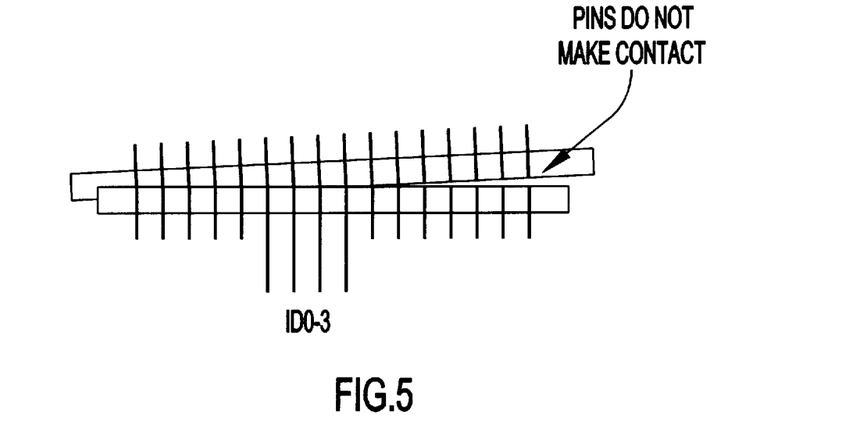
FIG. 5 shows a connection failure for a connector.
Figure 6:
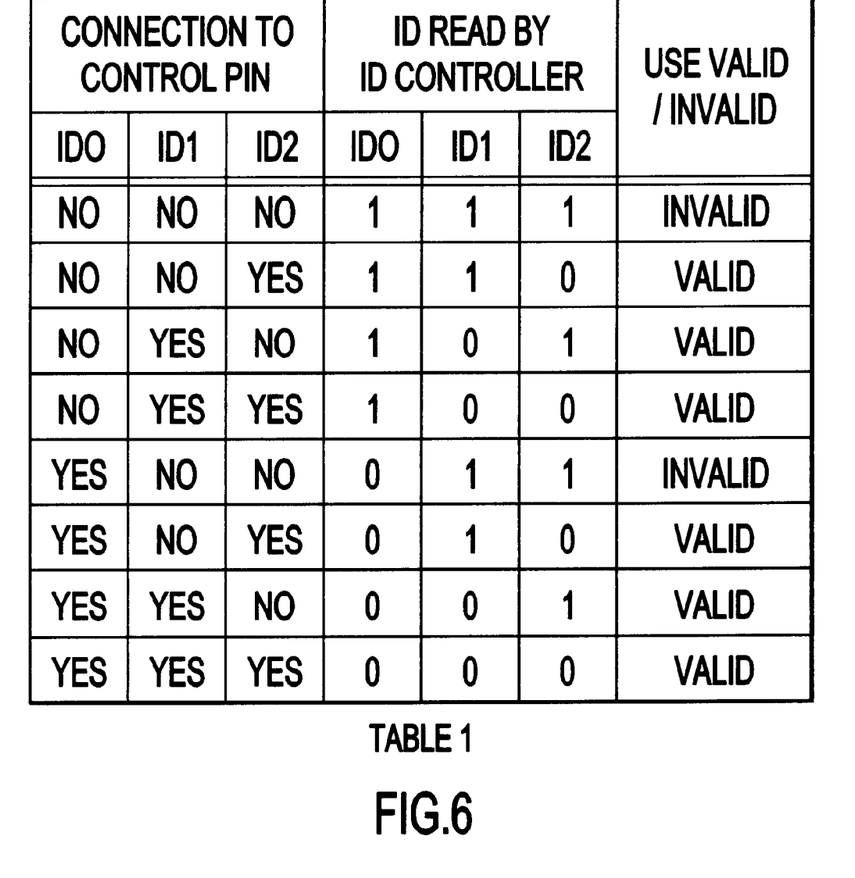
FIG. 6 shows Table 1 containing connection and device identification information.

Two combinations, (ID0, ID1, ID2)=(1, 1, 1) and (ID0, ID1, ID2)=(0, 1, 1), which are not shown in FIG. 2, are not permitted in this embodiment. In these prohibited combinations, all the identification pins on the side opposite to the control pins are in the disconnected state. If the two combinations are permitted, whether or not identification value "1" is a normal value or a value due to a connection failure cannot be determined. As is to be described later, all the identification signal lines on the planar 10 are pulled up to high. Thus, not only when the identification pins are disconnected from the control signal line within the external device, but also when these pins are floating because of the occurrence of a connection failure as illustrated in FIG. 5, a high level for the identification pins, i.e., the identification value "1" is read. If identification value "1" is provided for both identification pins ID1 and ID2 on the side opposite to the control pins, whether the obtained identification value "1" is a correct value or a value due to a connection failure cannot be determined. In this embodiment, since at least one of the identification pins ID1 and ID2 is to be connected to the control pin, the low level will be read on the side opposite to the control pin in accordance with a normal connection. That is, the employment of the identification pin can indicate the occurrence of the connection failure shown in FIG. 5. The above two combinations are prohibited, so that there are only six ($=2^3-2$) possible combinations. The combinations of connections/disconnections for the identification pins in this embodiment are shown in Table 1 of FIG. 6.

In order to implement the automatic detection technology of the present invention, it is necessary for the identification pins to be located at either end of the connector. The number of identification pins is not important. For example, two or more identification pins may be provided on one end of the connector, and three or more identification pins may be provided on the other end. In this case, the number of external devices that can be identified is increased.

Referring again to FIG. 1, the arrangement and the operation of the planar 10 will be described. Identification signal lines are disposed on the planar 10 to read, from the connectors 11A, 11B and 11C, the signal levels of the identification pins ID0, ID1 and ID2. As is shown in FIG. 1, the identification signal lines are multiplexed. More specifically, the identification pins ID0 in the connectors 11A, 11B and 11C are connected through diodes to identification signal line #0, and similarly, the identification pins ID1 and ID2 in the connectors 11A, 11B and 11C are connected through diodes to identification signal lines #1 and #2. As the results are obtained by the multiplexing of the signal lines, the number of identification pins is reduced in comparison with that in the prior art in FIG. 4.

The planar 10 outputs a control signal for video subsystem selection, a control signal for network subsystem selection, and a control signal for storage subsystem selection at the connectors 11A, 11B and 11C. The control signals are allocated to the control pins among the corresponding connectors 11A, 11B and 11C. A specific connector can be selected by the planar 10 asserting the low level for one of the control signals, and thereby automatic detection is performed. The control signal supply source is the ID controller 11 (which will be described later) for performing an automatic detection process, but may be another controller chip. The assertion of the control signals must be synchronized with the automatic detection.

The identification signal lines #0, #1 and #2 are connected to the input pins ID0, ID1 and ID2 of the ID controller 11. Further, the identification signal lines #0, #1 and #2 are pulled up at the ends by power voltage $V_{cc}$. Resistors provided at the ends of the identification signal lines are used to determine a pull-up voltage. As a result, a signal at a high level is input to the input pins ID0, ID1 and ID2 of the ID controller 11, and only when a control signal at a low level is asserted, a signal at a low level is input from one of identification pins.

The ID controller 11 employs data read from its input pins ID0, ID1 and ID2 to confirm the connection state of a selected connector and to identify a connected external device. When the connection state of a specific external device is to be detected, a signal at a low level is selectively asserted only for a control signal line associated with the pertinent connector. The external device connected to the selected connector receives a low level signal at its control pin. If the level at least one of the pins ID1 and ID2 becomes low, it is assumed that there is normal contact at both ends of the oblong connector. When a connection failure occurs due to the diagonal insertion of the connector (see FIG. 5), a signal at a low level is not transmitted to either pin ID1 or ID2. Therefore, the ID controller 11, which serves as detection means, will determine that a connection is adequate when the one of the pins ID1 and ID2 indicates a low level, and will determine that there is a connection failure when both pins ID1 and ID2 maintain a high level.

The external device indicates identification information by a combination of the connections/disconnections between the control pin and the pins among the first and the second identification pin groups. When a low level is applied to the control signal lines, the respective identification pins ID0, ID1 and ID2 indicate signal levels in accordance with the connections/disconnections to the control pins. The ID controller 11, which serves as identification means, reads the levels at its input pins ID0, ID1 and ID2 to acquire the identification numbers of the external devices that are connected.

In the example in FIG. 1, a card having identification information (ID0, ID1, ID2)=(1, 0, 1) is inserted into the connector 11A of the video subsystem. The ID controller 11 asserts a low level for the video subsystem selection control signal, reads the identification number of the card, 5 ($=2^0+2^2$), and thereby identifies the card. Similarly, a card having identification information (ID0, ID1, ID2)=(0, 0, 1) is inserted into the connector 11B of the network subsystem. The ID controller 11 asserts a low level for the network subsystem selection control signal, and reads the identification number 4 ($=2^2$). In addition, a drive unit having identification information (ID0, ID1, ID2)=(1, 0, 0) is inserted into the connector 11C of the storage subsystem. The ID controller 11 asserts a low level for the storage subsystem selection control signal, and reads the identification number 1 ($=2^0$).

Although many electric circuits other than those shown in FIG. 1 are required to construct the information processing apparatus 100, they are well known to one having ordinary skill in the art. And as they are not directly related to the subject of the present invention, no explanation for them will be given. Further, it should be noted that, to avoid making the drawings too complex, only one part of the connections between the hardware blocks in FIG. 1 is shown.

The present invention has been described in detail while referring to a specific embodiment. However, it should be obvious to one having ordinary skill in the art that various modifications or revisions of the embodiment are possible within the scope of the present invention. That is, although the present invention has been disclosed by using an example, it should not be limited to that example. To fully understand the subject of the present invention, the claims should be referred to.

Having thus described our invention, what we claim as new and desire to secure by Letters Patent is:

1. An automatic detection unit for identifying an external device and diagnosing connections, comprising:
   (a) a connector having a plurality of connector pins;
   (b) a first identification pin group consisting of one or more connector pins arranged in the longitudinal direction at a first end of said connector;
   (c) a second identification pin group consisting of more than one connector pins arranged in the longitudinal direction at a second end of said connector;
   (d) a control signal line assigned for one pin at said first end of said connector;
   (e) means for applying a second signal level to said control signal line;
   (f) selection means for setting said control signal line to a first signal level to diagnose a connection with an external device and to identify the external device, and for maintaining said control signal line at said second signal level on all other occasions;

(g) an identification signal line along which to transmit the respective signal levels at pins in said first and said second identification pin groups;

(h) diagnostic means for diagnosing the connection with an external device connected through said connector by determining whether said first signal level is detected among said second identification pin group when said control signal line is reduced to said first signal level; and (i) identification means for reading a combination of the signal levels at the pins in said first and said second identification pin groups and for identifying an external device connected through said connector when said control signal line is reduced to said first signal level.

2. An automatic detection unit for identifying a plurality of external devices and diagnosing connections, comprising:

(a) a connector provided for each of said plurality of external devices, each of said connectors having a plurality of connector pins;

(b) first identification pin groups provided for each of said connectors, each of said first identification pin groups consisting of one or more connector pins arranged in the longitudinal direction at a first end of each of said connectors;

(c) second identification pin groups provided for each of said connectors, each of said second identification pin groups consisting of more than one connector pins arranged in the longitudinal direction at the second end of each of said connectors;

(d) control signal lines provided for each of said connectors and assigned to one pin at said first end of each of said connectors;

(e) means for applying signals to said control signal lines;

(f) selection means for setting one of said control signal lines to a first signal level to diagnose connection with an external device and to identify the external device, and for maintaining the control signal lines at a second signal level on all other occasions;

(g) an identification signal line along which to transmit the respective signal levels at pins in said first and said second identification pin groups;

(h) diagnostic means for diagnosing the connections with an external device connected through one of said connectors by determining whether said first signal level is detected among the corresponding second identification pin group when the control signal line is reduced to said first signal level; and (i) identification means for reading a combination of the signal levels at the pins in the corresponding first and second identification pin groups and for identifying an external device connected through one of said connectors when the corresponding control signal line is reduced to said first signal level.

3. The automatic detection unit of claim 2 wherein said first signal level comprises a low signal level and said second signal level comprises a high signal level.

4. The automatic detection unit according to claim 3, wherein said identification signal line is multiplexed and employed between said connectors.

5. The automatic detection unit according to claim 2, wherein said identification signal line is multiplexed and employed between said connectors.

6. Information processing apparatus comprising:

at least one processing unit;

at least one external device connected to said processing unit; and an automatic detection unit for identifying said at least one external device and for diagnosing connections to said at least one processing unit, comprising:

(a) a connector having a plurality of connector pins;

(b) a first identification pin group consisting of a plurality of connector pins arranged in the longitudinal direction at a first end of said connector;

(c) a second identification pin group consisting of more than one connector pins arranged in the longitudinal direction at a second end of said connector;

(d) a control signal line assigned for one pin at said first end of said connector;

(e) means for applying a second signal level to said control signal line;

(f) selection means for setting said control signal line to a first signal level to diagnose a connection with an external device and to identify the external device, and for maintaining said control signal line at said second signal level on all other occasions;

(g) an identification signal line along which to transmit the respective signal levels at pins in said first and said second identification pin groups;

(h) diagnostic means for diagnosing the connection with an external device connected through said connector by determining whether said first signal level is detected among said second identification pin group when said control signal line is reduced to said first signal level; and (i) identification means for reading a combination of the signal levels at the pins in said first and said second identification pin groups and for identifying an external device connected through said connector when said control signal line is reduced to said first signal level.

7. Information processing apparatus comprising:

at least one processing unit;

at least one external device connected to said processing unit; and an automatic detection unit for identifying said at least one external device and for diagnosing connections to said at least one processing unit, comprising:

(a) a connector provided for each of said at least one external device, each of said connectors having a plurality of connector pins;

(b) first identification pin groups provided for each of said connectors, each of said first identification pin groups consisting of a plurality of connector pins arranged in the longitudinal direction at a first end of each of said connectors;

(c) second identification pin groups provided for each of said connectors, each of said second identification pin groups consisting of more than one connector pins arranged in the longitudinal direction at the second end of each of said connectors;

(d) control signal lines provided for each of said connectors and assigned to one pin at said first end of each of said connectors;

(e) means for applying a second signal level to said control signal lines;

(f) selection means for setting one of said control signal lines to a first signal level to diagnose connection with an external device and to identify the external device, and for maintaining the control signal lines at said second signal level on all other occasions;

(g) an identification signal line along which to transmit the respective signal levels at pins in said first and said second identification pin groups;

(h) diagnostic means for diagnosing the connections with one of said at least one external device connected through one of said connectors by determining whether said first signal level is detected among the corresponding second identification pin group when the control signal line is reduced to said first signal level; and (i) identification means for reading a combination of the signal levels at the pins in the corresponding first and second identification pin groups and for identifying an external device connected through one of said connectors when the corresponding control signal line is reduced to said first signal level.

8. The information processing apparatus of claim 7 wherein said first signal level comprises a low signal level and said second signal level comprises a high signal level.

9. An external device for connection to another apparatus through a connector having a plurality of connector pins, comprising:

(a) a first identification pin group consisting of a plurality of connector pins arranged in the longitudinal direction at a first end of said connector;

(b) a second identification pin group consisting of more than one connector pins arranged in the longitudinal direction at the second end of said connector;

(c) a control pin assigned for receiving a control signal line on said first end of said connector; and (d) identification information forming means for connecting at least one pin among said second identification pin group to said control signal line, and for forming identification information in accordance with the combination of the connection and disconnection between the respective pins among said first and second identification pin groups and said control signal line.

10. An external device which can be connected through a connector to an automatic detection unit associated with a computer system having a control signal generator for applying a control signal at said connector comprising:

(a) a first identification pin group consisting of a plurality of connector pins arranged in the longitudinal direction at a first end of said connector;

(b) a second identification pin group consisting of more than one connector pins arranged in the longitudinal direction at the other end of said connector;

(c) a control pin for receiving a control signal line at said first end of said connector; and (d) identification information forming means for connecting at least one pin among said second identification pin group to said control signal line, and forming identification information in accordance with the combination of the connection and disconnection between the respective pins among said first and second identification pin groups and said control signal line.

* * * * *